US007597188B2

(12) United States Patent
Volpi

(10) Patent No.: US 7,597,188 B2
(45) Date of Patent: Oct. 6, 2009

(54) BELT MODULE WITH MAGNETIC PROPERTIES

(75) Inventor: Giovanni Volpi, Arlesheim (IT)

(73) Assignee: Habasit AG, Reinach (CH)

( * ) Notice: Subject to any disclaimer, the term of this patent is extended or adjusted under 35 U.S.C. 154(b) by 0 days.

(21) Appl. No.: 11/451,088

(22) Filed: Jun. 12, 2006

(65) Prior Publication Data

US 2007/0284225 A1  Dec. 13, 2007

(51) Int. Cl.
*B65G 17/46* (2006.01)
(52) U.S. Cl. .................... 198/690.1; 198/853
(58) Field of Classification Search .......... 198/690.1, 198/850, 853
See application file for complete search history.

(56) References Cited

U.S. PATENT DOCUMENTS

| 4,742,906 A | 5/1988 | Wallaart |
| 4,805,764 A | 2/1989 | van Zijderveld, Jr. |
| 4,823,939 A | 4/1989 | Langhans et al. |
| 5,036,969 A | 8/1991 | Garbagnati |
| 5,165,527 A * | 11/1992 | Garbagnati ............ 198/805 |
| 5,176,247 A | 1/1993 | Counter |
| 5,738,205 A | 4/1998 | Draebel |
| 5,779,027 A | 7/1998 | Ensch |
| 6,814,224 B2 | 11/2004 | Garbagnati |
| 7,121,400 B2 * | 10/2006 | Fandella ............ 198/619 |
| 7,410,048 B2 * | 8/2008 | Verduijn et al. ......... 198/852 |
| 2003/0047428 A1 | 3/2003 | Cediel et al. |
| 2006/0113696 A1 | 6/2006 | Aisenbrey |

FOREIGN PATENT DOCUMENTS

| DE | 4221546 | 1/1994 |
| JP | 03 216409 | 9/1991 |
| WO | 03/011558 | 2/2003 |

* cited by examiner

*Primary Examiner*—James R Bidwell
(74) *Attorney, Agent, or Firm*—Hodgson Russ LLP

(57) ABSTRACT

A module for chains or belts that is molded from a plastic compound containing a magnetizable element. The molding may be performed in a standard injection molding machine equipped with a device that produces an electromagnetic or permanent magnetic field. The field lines are directed in such a way as to penetrate the mold cavities and the molded part in the desired axis, in order to electrically charge the magnetizable particles and orient them to form a permanently magnetized plastic body. After discharge of the mold, the plastic part has magnetic properties with opposite charges at opposite poles.

8 Claims, 7 Drawing Sheets

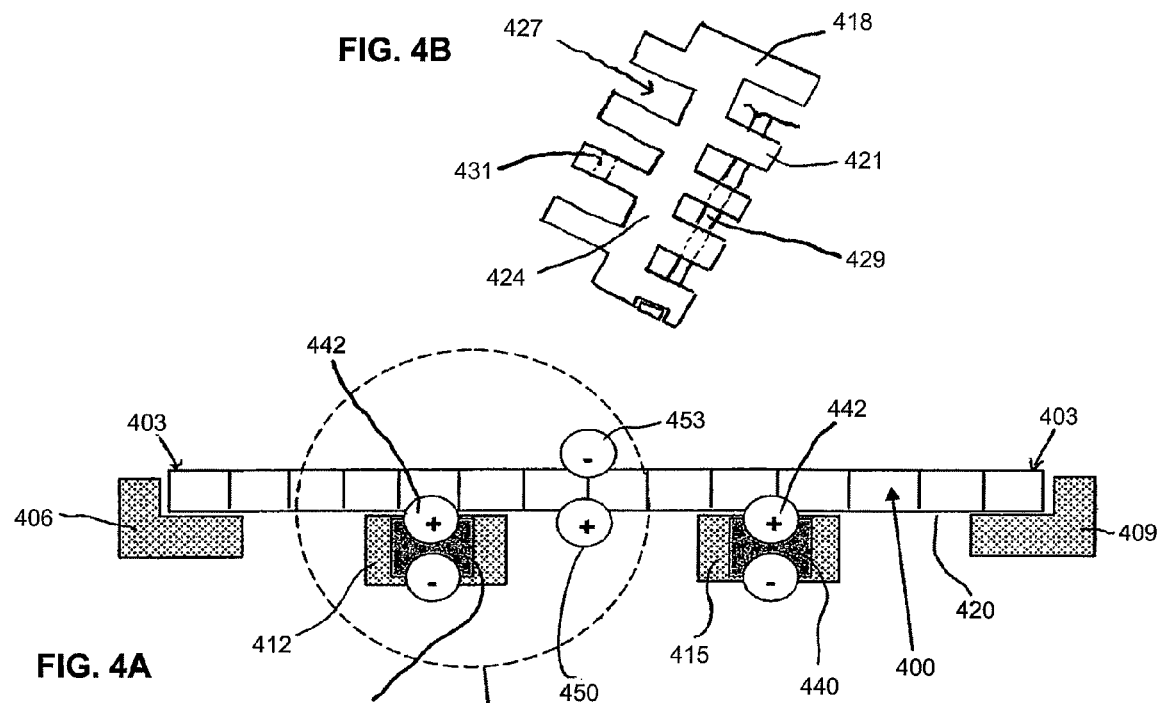
FIG. 4B
FIG. 4A
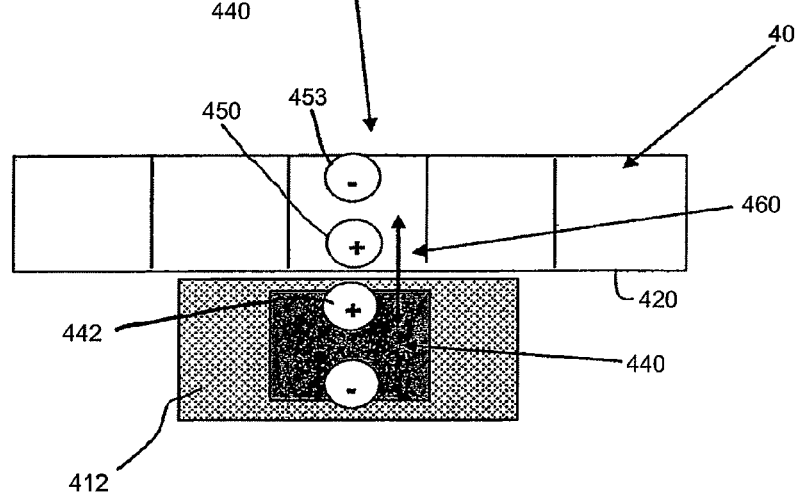
FIG. 5 skin material 538

PLASTICIZING core material 540

BELT MODULE WITH MAGNETIC PROPERTIES

FIELD OF THE INVENTION

The present invention relates to chain or belt modules for conveying systems.

BACKGROUND OF THE INVENTION

Modular chains are typically designed to run in a guide as shown in various patents, e.g., U.S. Pat. Nos. 4,742,906; 4,805,764; and 5,036,969. In order to improve the running properties of the chains, various systems have been proposed for holding the chains down in their guide channel by means of magnetic forces. In most cases, permanent magnets are installed in the guide. The chain modules are typically constructed of ferromagnetic material to be dragged against the magnetic guide and thus, due in part to the magnetic forces, the chain modules do not vibrate or lift off when moving. The ferromagnetic properties of the chain modules can be achieved by producing the module completely from ferromagnetic steel, by using ferromagnetic hinge pins, or by adding ferromagnetic powder to the plastic resin used to produce the modules (U.S. Pat. No. 4,823,939).

One of the problems associated with the above described methods is the high manufacturing cost. The magnetic elements (permanent magnets) need to be incorporated into the guides either by installing them piece by piece into cavities provided in the guide bodies and securing them mechanically or by gluing and the like. Further, the magnets may create additional friction by holding the modules pressed into the guide channel. This additional friction can result in excessive abrasion leading to a shortening of the useful life of the chain.

There is also a need for holding down belt modules of the "bricklayed" variety including straight running and radius belts.

There are also applications for modular belts and chains where the need is to reduce the friction forces between the chain or modular belt and their guides or slider supports. The reduction of friction is of particular importance for radius belts and chains as well as for heavily loaded straight running conveyor belts. Since the friction between guides or supports and moving chains/belts is determined by the combination of their materials, the reduction of friction and also wear can only be achieved by optimal selection of these material combinations. In some cases, if acceptable, the guides and/or supports are lubricated to reduce the friction.

Accordingly, there is a need for an economic way to produce magnetic chain or belt modules for use with magnetic guides for holding the modules on the guide. Further, there is also a need for reducing the friction forces between chains or belt modules and guides or supports.

SUMMARY OF THE INVENTION

The present invention meets the above-described need by providing modules for chains or belts that are molded from a plastic compound containing a magnetizable element. The molding may be performed in a standard injection molding machine equipped with a device that produces an electromagnetic or permanent magnetic field. The field lines are directed in such a way as to penetrate the mold cavities and the molded part in the desired axis, in order to electrically charge the magnetizable particles and orient them to form a permanently magnetized plastic body. After discharge of the mold, the plastic part has magnetic properties with opposite charges at opposite poles. As an alternative, the molded part may be exposed to a magnetic field in a separate step after the molding is finished.

In one molding technique referred to herein as the sandwich molding method, the sandwich configuration is achieved when two polymeric materials are conveyed one after the other into the mold cavity. When the polymeric materials are injected under laminar flow conditions, the injection melt begins to solidify immediately as it contacts the mold wall so that the melt at the center of the flow advances faster than the melt in the vicinity of the mold wall. Accordingly, polymeric material injected later displaces material injected earlier, particularly in the middle of the cross-section of the flow stream, while the melt that contacts the cold mold walls solidifies to form and maintain the outer or skin layer of the module. In this manner, the second polymeric material serves as the core structure and provides the module of the present invention having a sandwich layer. By including a component having magnetizable particles in the second polymeric material a module having a magnetic inner core with an outer non-magnetic shell for improved mechanical properties may be formed.

BRIEF DESCRIPTION OF THE DRAWINGS

The invention is illustrated in the drawings in which like reference characters designate the same or similar parts throughout the figures of which:

FIG. 4A is a cross-sectional view of a belt module of the present invention;

FIG. 4B is a top plan view of a belt module of the present invention;

FIG. 5 is an enlarged view of a portion of the module shown in FIG. 4A;

DETAILED DESCRIPTION OF THE INVENTION

Figure 1A:
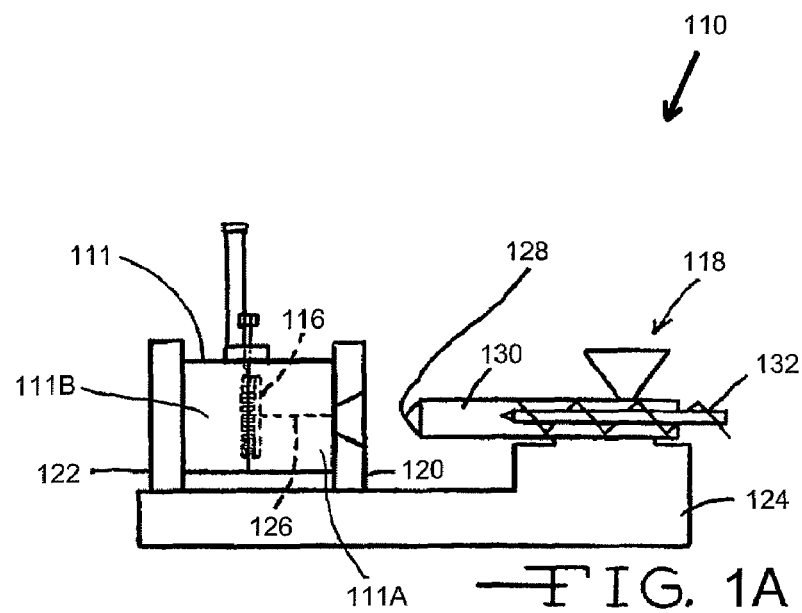
FIGS. 1A to 1C show a diagrammatic section through an injection molding apparatus suitable for manufacturing a module for a modular conveyor belt or chain according to the present invention.
Figure 1B:
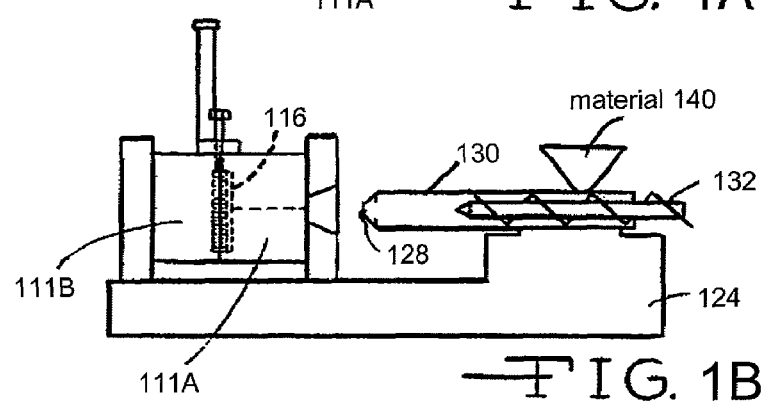
Figure 1C:
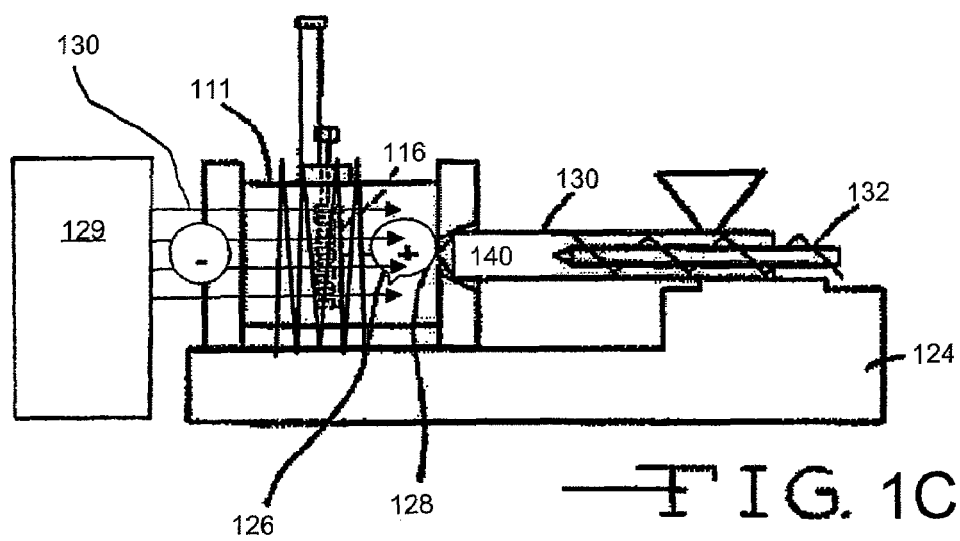

FIGS. 1A to 1C show a molding apparatus 110 including a mold 111 for making a module for a modular conveyor belt or chain according to the present invention. The mold 111 for producing the modules 10 includes first and second mating mold halves 111A, 111B forming a mold cavity 116 for receiving a plastic melt from an injection unit 118. The mating mold halves 111A, 111B are mounted on a stationary platen 120 and a moving platen 122, respectively. The stationary platen 120, moving platen 122 and injection unit 118 are supported by a common base 124. The mold 111 includes a sprue channel 126 through the first mold half 111A which is in fluid flow communication with a nozzle 128 on the injection unit 118 when material is injected into mold cavity 116. The nozzle 128 is equipped with a shut-off valve (not shown) of the type that is well known in the art.

The injection unit 118 has a barrel 130 that includes a feed screw 132 of a configuration that is typical for injection molding. The feed screw 132 is controlled to reciprocate in the barrel 130 to plasticize and inject plastic into the mold 111. The injection unit 118 is equipped with means, such as a hydraulic cylinder (not shown) to move the unit 118 linearly toward and away from the mold 111. More specifically the injection unit 118 is moved against the mold 111 for injection, then is retracted away from the mold 111 and stationary platen 120.

A cycle of operation for the production of a module made by a molding method according to the present invention will now be described with respect to FIGS. 1A to 1C. The injection unit 118 is retracted to a rearward position (FIG. 1A), that provides clearance between the stationary platen 120 and the nozzle 128. The injection unit 118 plasticizes a sufficient quantity of the material 140 by rotating and retracting the feed screw 132 in a conventional manner so a full shot of melt is prepared. The material 140 may comprise a plastic compound containing a magnetizable component. The magnetizable component may comprise GRILAMID XE3738 (Polyamid 12) which is a heat stabilized Polyamide 12 with 90% by weight anisotropic Ferrite available from EMS-CHEMIE. The material can be processed in all injection molding machines that are suitable for processing polyamides. As an alternative, the magnetizable material may comprise GRIVORY HT2 XE 3714 which is a heat stabilized, injection molding co-polyamide with a high melting point containing 88% by weight NdFeB rare earth alloy also available from EMS-CHEMIE. Other magnetizable materials including magnetizable plastic polymers or other moldable materials may also be suitable as will be evident to persons of ordinary skill in the art based on this disclosure.

The injection unit 118 moves forward to a position where the nozzle 128 communicates with the sprue channel 126 of the mold 111. As shown in FIG. 1C, the injection unit 118 then injects the polymeric material 140 into the mold 111 by advancing the feed screw 132 in a manner typical of the injection molding process. The injected material 140 fills the cavity 116. A device 129 produces an electromagnetic or permanent magnetic field 130. The field lines are directed in such a way to penetrate the mold cavity 116 and the molded part in a desired axis in order to electrically charge the magnetizable particles and orient them to from a permanently magnetized plastic body.

After cooling, the two mold halves open and the magnetized module can be removed. As will be evident to those of ordinary skill in the art based on this disclosure, mold 116 may be shaped to form a piece in the shape of a chain module, belt module, or other shape. The module 10 has magnetic properties with north and south pole (plus and minus).

As an alternative, the molded part may be exposed to a magnetic field in a separate step that occurs after molding.

Figure 2A:
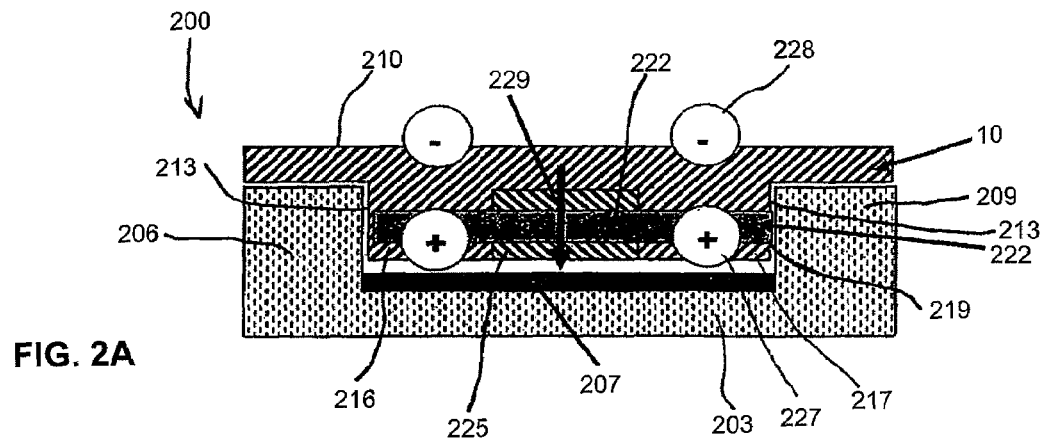
FIG. 2A is a cross-sectional view of a chain module disposed inside a guide.
Figure 2B:
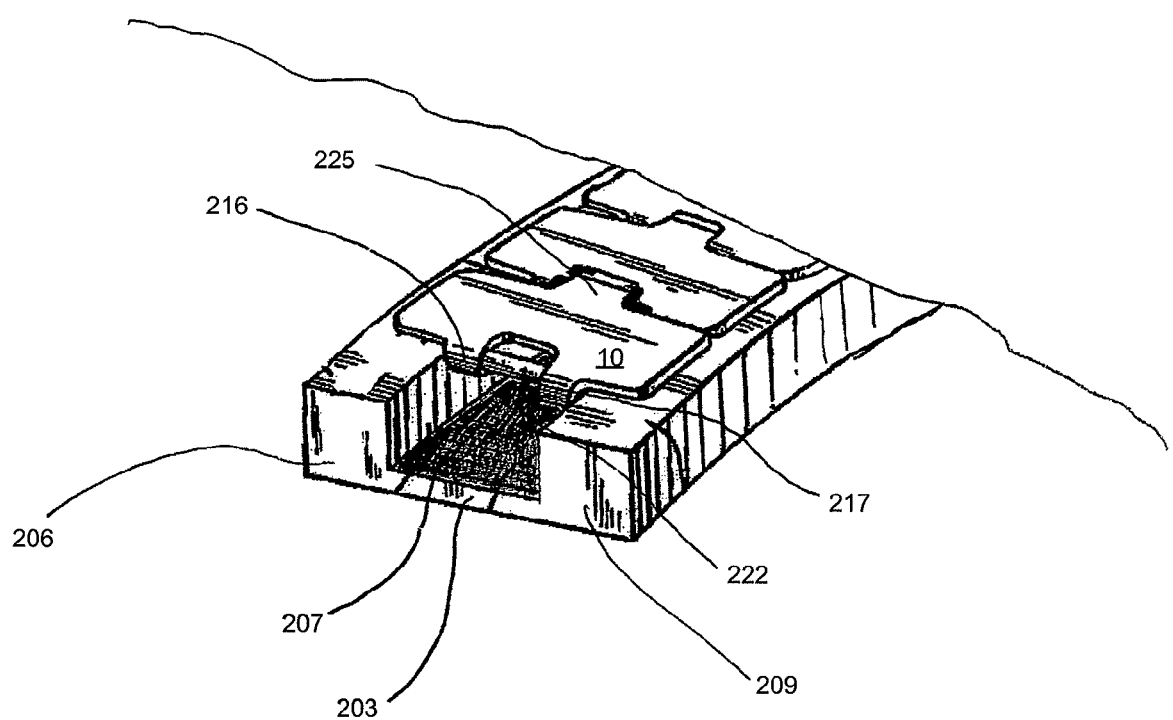
FIG. 2B is a partial perspective view of a chain module of the present invention disposed inside a guide.

Turning to FIGS. 2A-2B, a U-shaped guide 200 may include a base portion 203 connecting a pair of side portions 206 and 209. The base portion 203 and side portions 206, 209 form a U-shaped channel for guiding the chain module 10. The U-shaped channel may be provided with a ferromagnetic plate 207 or the like located on the bottom wall of the channel adjacent to the base portion 203.

The chain module 10 has an upper surface 210. Chain module 10 has a pair of guide surfaces 213 disposed adjacent to hinge eyes 216, 217. The spaced apart hinge eyes 216, 217 have transverse openings 219 for receiving a chain pin 222. The chain pin 222 connects the module 10 to a hinge eye 225 disposed on an adjacent module and extending into the space between hinge eyes 216, 217. The guide surfaces 213 slide inside the U-shaped channel adjacent to the side portions 206 and 209. The arrangement shown in FIG. 2A provides a track for guiding magnetized modules 10 that are provided with magnetized properties as described above. The bottom of the module 10 is provided with a positive charge 227. The top of the module 10 is provided with a negative charge 228. The magnetic force (in the direction of arrow 229) between the magnetized module 10 and the ferromagnetic plate 207 reduces the vibration of the chain and prevents the chain modules 10 from lifting off of the track.

Figure 3:
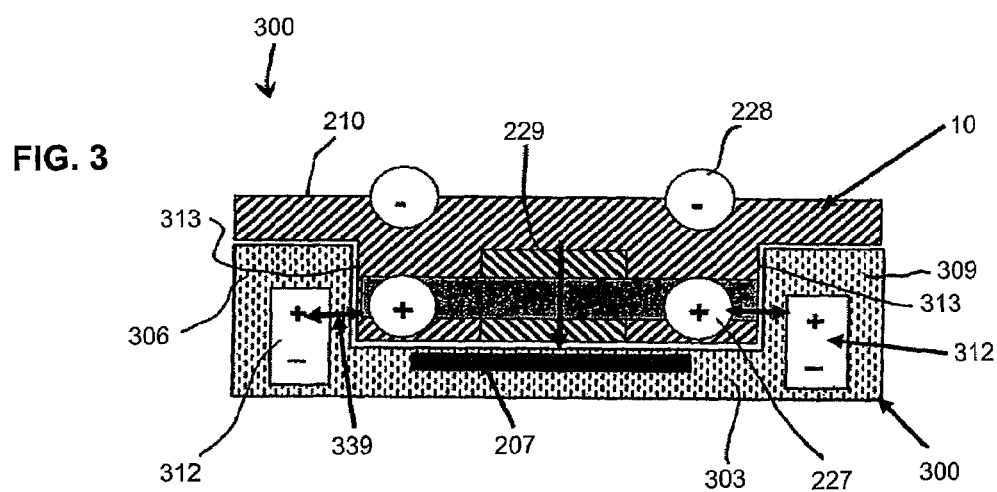
FIG. 3 is a cross-sectional view of an alternate embodiment of a chain module disposed inside a guide.

Turning to FIG. 3, an alternate embodiment of the chain guide is shown. The chain guide 300 has a base portion 303 extending to a pair of spaced apart side wall portions 306 and 309. The base portion 303 and the side wall portions 306 and 309 form a U-shaped track for guiding the magnetic module 10. The side wall portions 306 and 309 may include magnets 312. The magnets 312 are arranged with a polarity such that the magnetic charge repels the magnetic modules 10 in the direction of arrow 339. Accordingly, the magnets 312 act to reduce the friction of the module 10 in the guide by repelling the guide surfaces 313 on the magnetic modules 10 from the side wall portions 306, 309 of the chain guide 300.

In FIGS. 4A-4B and 5, a modular conveyor belt 400 is shown. The belt 400 is supported at the outer edges 403 by a pair of supports 406 and 409. Towards the middle of the belt 400, a pair of support strips 412 and 415 are disposed underneath the belt 400 to provide additional support. The belt 400 is constructed of individual belt modules 418 which are provided with magnetic properties as described above. The individual belt modules 418 have a plurality of spaced apart link ends 421 extending from opposite sides of an intermediate portion 424. Adjacent modules are intercalated such that the link ends 421 of an adjacent module fit into spaces 427 between the link ends of an adjacent module. A pivot rod 429 is disposed between a set of aligned transverse openings 431 disposed in the link ends. Pivot rod 429 is shown with a single module 418 and the adjacent module has been removed for clarity. The pivot rod pivotally connects adjacent rows of modules such that the resulting modular belt can pivot around a sprocket (not shown). The individual modules 418 may be connected in a "bricklayed" fashion as will be evident to those of ordinary skill in the art based on this disclosure.

The support strips 412 and 415 may include magnets 440 disposed such that the positive charge 442 is located on the top side. The magnetic modules 418 may be provided with a positive charge 450 on the bottom side 420 of the belt 400 and a negative charge 453 on the top of the belt 400. Accordingly, the arrangement of the charge on the belt 400 and the support strips 412, 415 causes the belt 400 to be pushed away from the supports in the direction of arrow 460. The magnetized module 418 and the permanent magnet 440 disposed in the support strips 412 and 415 reduce the frictional forces between the belt 400 and support strips 412 and 415.

Many other applications are possible by combining magnetic modules of the present invention with ferromagnetic elements on one side or by combining magnetic modules with permanent magnets or electromagnetic elements. For example, with respect to a radius belt, magnetic edge modules may be combined with magnetic edge guides on the inner radius edge to reduce the pressure of the radius belt modules on the inner edge guide when the belt is moving through a curve. Also, radius belts can be held down by means of magnetic modules running on a slider base with magnets installed therein, in order to avoid flipping over or buckling in a curve.

Also, a magnetic belt module of the present invention could be used to hold ferromagnetic cans or containers in position while the belt is traversing an inclined pathway.

Belts or chains of the present invention may be produced completely from magnetic material or magnetic modules may be assembled in combination with non-magnetic modules to reduce the cost or to provide magnetic forces only in specific areas. In order to improve the friction properties, magnetic modules may also be produced from at least two materials by mechanical fixing or by an overmolding process or the like as will be evident to those of ordinary skill in the art based on this disclosure.

Figure 6A:
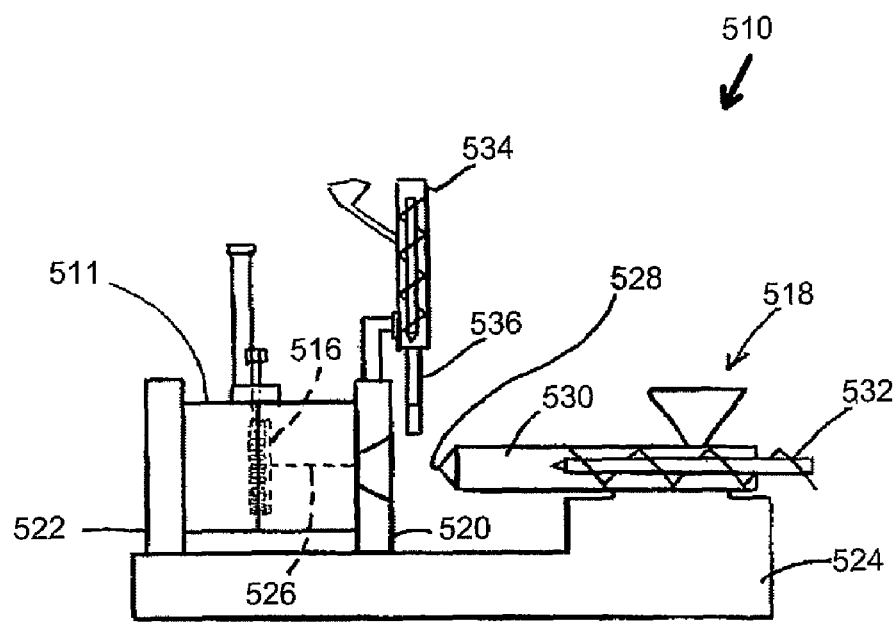
FIGS. 6A-6C show a diagrammatic section through an injection molding apparatus suitable for manufacturing a module according to the present invention.
Figure 6B:
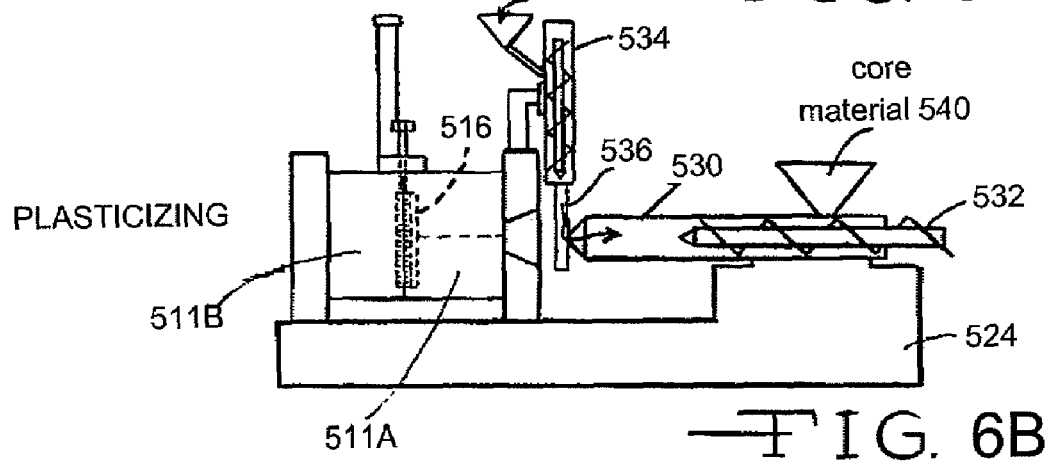
Figure 6C:
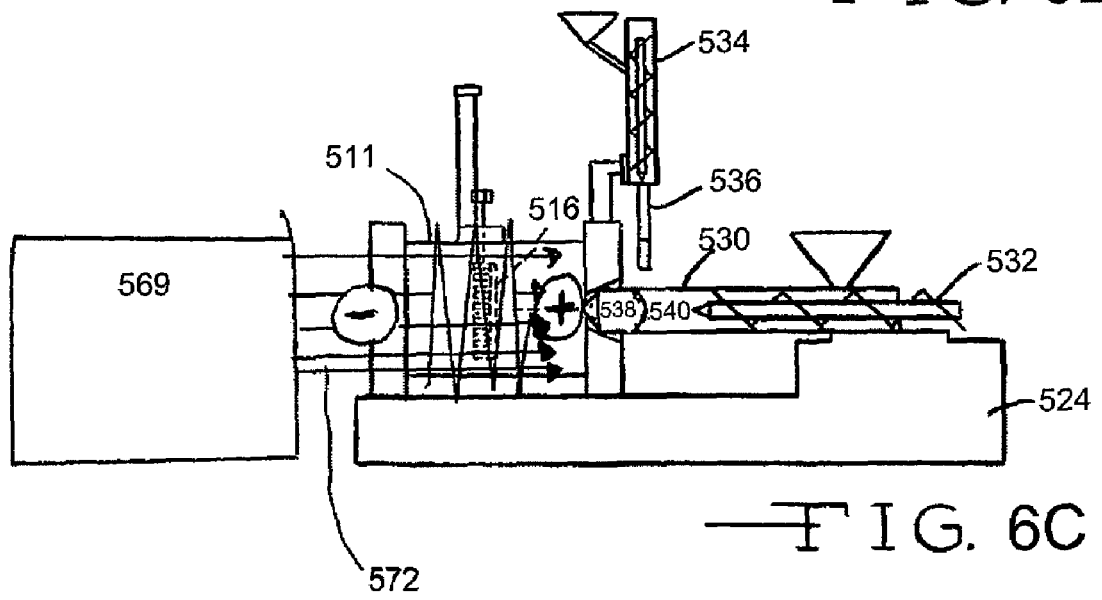
Figure 8:
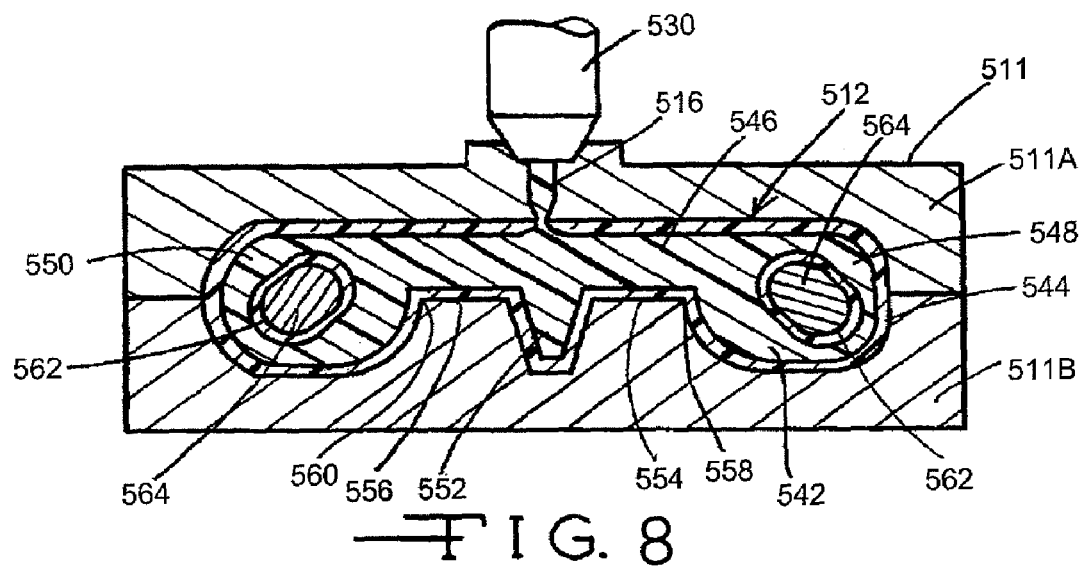
FIG. 8 is a cross-sectional view along line 8-8 of FIG. 7.
Figure 7:
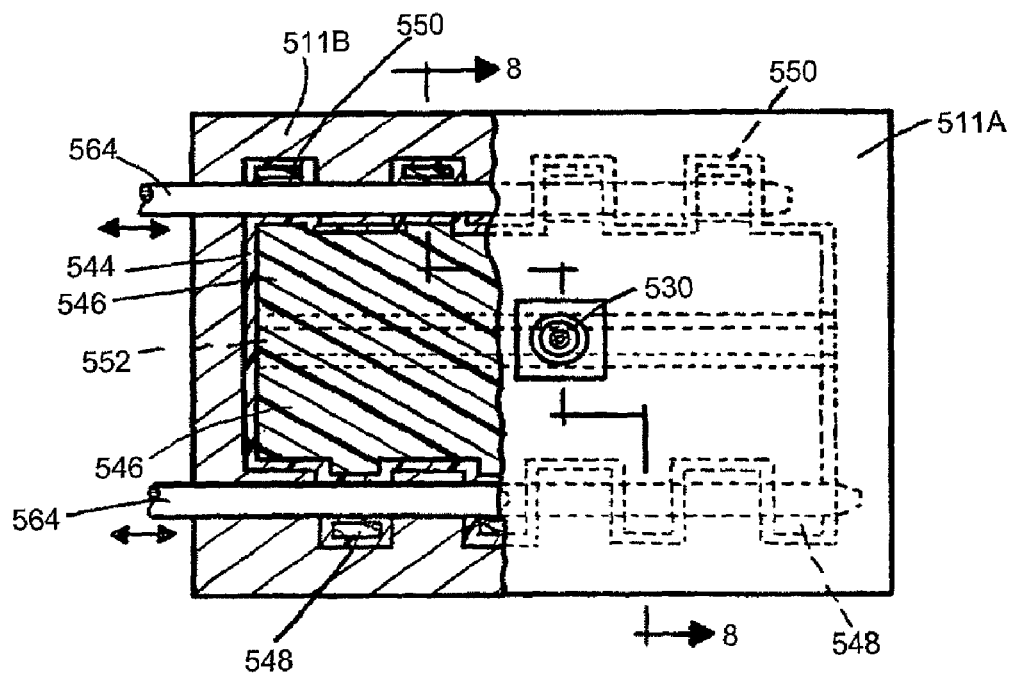
FIG. 7 is a plan view, partly broken away, of one embodiment of a mold for the sandwich molding method for constructing a flat top module according to the present invention.
Figure 9:
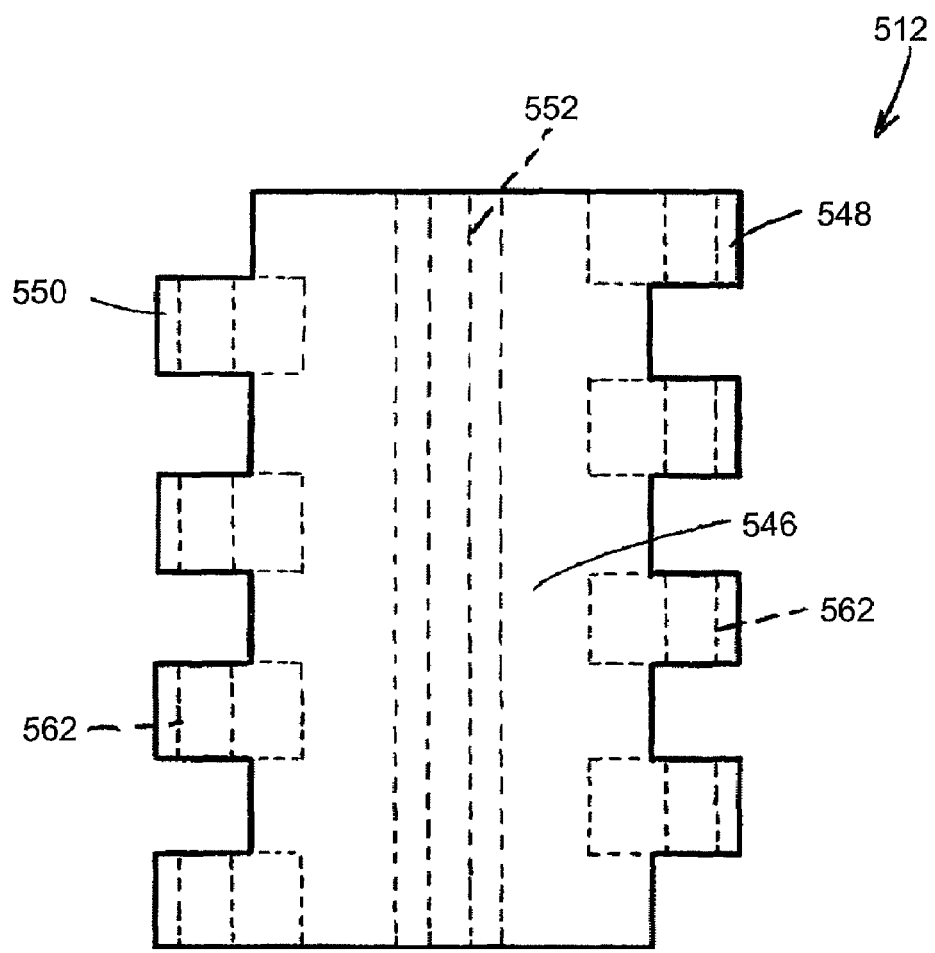
FIG. 9 is a plan view of a flat top module according to the present invention.

FIGS. 6A to 6C show a sandwich molding apparatus 510 including a mold 511 for making a sandwich module for a modular conveyor belt according to the present invention. An exemplary sandwich layer constructed flat top module 512 is shown in FIGS. 7 to 9. The structure of these modules will be described in detail below.

The mold 511 for producing the modules 512 having a sandwich layer construction includes first and second mating mold halves 511A, 511B forming a mold cavity 516 for receiving a plastic melt from an injection unit 518. The mating mold halves 511A, 511B are mounted on a stationary platen 520 and a moving platen 522, respectively. The stationary platen 520, moving platen 522 and injection unit 518 are supported by a common base 524. The mold 511 includes a sprue channel 526 through the first mold half 511A which is in fluid flow communication with a nozzle 528 on the injection unit 518 when material is injected into the mold cavity 516. The nozzle 528 is equipped with a shut-off valve (not shown) of the type that is well-known in the art.

The main injection unit 518 has a barrel 530 which includes a feed screw 532 of a configuration that is typical for injection molding. The feed screw is controlled to reciprocate in the barrel 530 to plasticize and inject plastic into the mold 511. The injection unit 518 is equipped with means, such as a hydraulic cylinder (not shown), to move the unit 518 linearly toward and away from the mold 511. More specifically, the injection unit 518 is moved against the mold 511 for injection, then is retracted away from the mold 511 and stationary platen 520, so that a second polymeric skin material can be fed into the injection unit barrel 530. The significance of a polymeric skin material will be described in detail below.

An auxiliary plasticizing unit 534 is mounted adjacent the injection unit 518 on the stationary platen 520 and is capable of movement along a line perpendicular to the injection unit 518. Connected to the end of the auxiliary plasticizing unit 534 is a hot runner manifold 536. This orientation of the auxiliary unit 534 facilitates its positioning so that the hot runner manifold 536 is properly aligned in front of the injection unit 518, enabling direct connection with the nozzle 528. The auxiliary unit 534 is a non-reciprocating extruder; however, it could also be a second reciprocating screw injection unit, if desired.

A cycle of operation for the production of a sandwich layer module made by a sandwich molding method according to the present invention will now be described with respect to FIGS. 6A to 6C. The injection unit 518 is retracted to a rearward position (FIG. 6A), that provides clearance between the stationary platen 520 and the nozzle 528. The auxiliary unit 534 is then moved downward so that the hot runner manifold 536 is disposed in front of the injection unit 518. The nozzle 528 of injection unit 518 then moves against the hot runner manifold 536 to establish a fluid tight connection between the injection unit 518 and the auxiliary unit 534. The auxiliary unit 534 is then activated to transfer plasticized skin material 538 via the hot runner manifold 536, through the nozzle 528 and into the end of the barrel 530 of the injection unit 518, causing the screw 532 to move backward within the barrel. As shown in FIG. 6B, transfer of the skin material 538 from the auxiliary unit 534 continues until a sufficient volume of polymeric material as defined by the module 512, 514 geometry has been transferred.

When the transfer of the polymeric skin material 538 is complete, the injection unit 518 plasticizes a sufficient quantity of the core material 540 by rotating and retracting the feed screw 532 in a conventional manner so that a full shot of melt is prepared. The core material 540 includes a composition having magnetizable particles capable of receiving a charge from a magnetic or electromagnetic field in order to form a permanently magnetized core layer. Simultaneously with the plasticizing function, the injection unit 518 disconnects from the auxiliary unit 534 by retracting slightly. The auxiliary unit 534 moves upward so that the injection unit 518 can now move forward unobstructed to a position where the nozzle 528 communicates with the sprue channel 526 of the mold 511. As shown in FIG. 6C, the injection unit 518 then injects the accumulated shot of skin polymeric material 538 followed by the core polymeric material 540 into the mold 511 by advancing the feed screw 532 in a manner typical of the injection molding process.

A device 569 produces an electromagnetic or permanent magnetic field 572. The field lines are directed in such a way to penetrate the mold cavity 516 and the molded part in a desired axis in order to electrically charge the magnetizable particles and orient them to from a permanently magnetized core surrounded by a skin layer.

As an alternative, the molded part may be exposed to a magnetic field in a separate step that occurs after molding.

Now that the molding apparatus 510 has been described in detail, an exemplary flat top module 512 having a sandwich layer construction provided by a sandwich molding process or method according to the present invention, will be described. The module 512 includes a component having magnetizable particles. More particularly, the module 512 is manufactured by the injection molding apparatus 510 shown in FIGS. 6A to 6C with the magnetizable material predominantly incorporated into the polymeric material of the core layer.

FIGS. 7 and 8 show the flat top module 512 being formed inside mold 511 while FIG. 9 shows the module 512 in its final form. The sandwich construction flat top module 512 comprises a core portion 542 surrounded by a skin portion 544. The polymeric material comprising the skin portion 544 contains suitable polymeric materials such as polyethylene, polypropylene homopolymer or copolymer, POM and ABS.

The sandwich construction flat top module 512 includes a generally rectangular plate-like body 546 having a first plurality of link ends 548 and a second plurality of link ends 550 extending in opposite directions therefrom. A transverse rib 552 extends across the width of the underside of the body 546 to form opposed channels 554 and 556 terminating at respective edges 558 and 560 from which the respective link ends 548 and 550 project. The rib 552 and the inside of the link ends 548, 550 are adapted to mate with corresponding sprocket teeth of a sprocket wheel (not shown) to impart a driving force to the conveyor belt formed by the interconnected modules 512. The under structure of the module 512 formed by the transverse rib 552 serves to strengthen the module and to prevent any significant binding of the module 512 about its longitudinal or transverse axes.

The link ends 548 and 550 circumscribe corresponding aligned cylindrically shaped openings 562. The openings 562 are provided by the provision of similarly shaped rods 564 in the mold 511 (FIGS. 7 and 8) and receive pivot pins or rods (not shown) adapted to pivotally connect a plurality of the modules in an end to end configuration while laterally aligning adjacent modules to form a modular conveyor belt (not shown). Preferably, the modules 512 are of link end configuration to be end-to-end reversible. In other words, either end of a module can mate with either end of any other link module.

While the invention has been described in connection with certain embodiments, it is not intended to limit the scope of the invention to the particular forms set forth, but, on the contrary, it is intended to cover such alternatives, modifications, and equivalents as may be included within the spirit and scope of the invention as defined by the appended claims.

What is claimed is:

1. A modular chain apparatus, comprising:
    a track having a U-shaped channel formed by an intermediate section connected to a pair of side walls, the track having a magnetic element disposed therein; and
    a chain module having a conveying surface, a first hinge eye disposed at a first end of the chain module and a pair of spaced apart second hinge eyes disposed at a second end disposed opposite from the first end, the chain module molded from a composition having a magnetizable material with magnetizable particles capable of forming a permanently magnetized chain module when exposed to a magnetic field during molding.

2. The modular chain apparatus of claim 1, further comprising a magnet disposed on the track in at least one of the side walls, the magnet being oriented such that the chain module is repelled from the side wall to reduce friction.

3. A modular belt system, comprising:
    a modular belt having a plurality of belt modules, each belt module having an intermediate section with a first plurality of link ends extending in a first direction therefrom and a second plurality of link ends extending in a second direction opposite the first direction, the first and second plurality of link ends having transverse openings defined therein, the transverse openings on the first and second link ends capable of aligning when the first link ends are intercalated with the second link ends of an adjacent module, the belt modules capable of being pivotally connected in rows by a pivot rod, at least one module molded from a composition having a magnetizable material with magnetizable particles capable of forming at least one permanently magnetized belt module when exposed to a magnetic field during molding; and,
    at least one support strip having a magnet disposed thereon.

4. The modular belt system of claim 3 wherein the magnet on the support strip is oriented so that it repels the at least one permanently magnetized belt module to reduce friction.

5. The modular belt system of claim 3, wherein the magnet on the support strip is oriented so that it attracts the at least one permanently magnetized belt module.

6. The modular belt system of claim 3, wherein the at least one permanently magnetized belt module is connected at the outermost edge of the belt.

7. The modular belt system of claim 6, wherein the modular belt is a radius belt.

8. The modular belt system of claim 7, wherein the magnetized edge module interacts with a magnet installed adjacent an inner edge when the belt is making a turn.

* * * * *